United States Patent [19]
Johnston

[11] Patent Number: 6,102,370
[45] Date of Patent: Aug. 15, 2000

[54] TRAILER WITH EXPANDABLE SIDES AND RETRACTABLE WHEELS

[76] Inventor: Paul Johnston, 1710 Rock Creek Dairy Rd., Whitsett, N.C. 27377

[21] Appl. No.: 09/291,939

[22] Filed: Apr. 15, 1999

[51] Int. Cl.$^7$ .................................................... E02C 3/00
[52] U.S. Cl. ........................ 254/89 H; 254/88; 254/420; 254/90
[58] Field of Search ................... 254/89 H, 88, 254/420, 90; 187/216, 221

[56] References Cited

U.S. PATENT DOCUMENTS

| | | |
|---|---|---|
| 3,931,895 | 1/1976 | Grimaldo . |
| 4,238,114 | 12/1980 | Migliorati . |
| 4,350,222 | 9/1982 | Lutteke et al. . |
| 4,394,877 | 7/1983 | Whyte . |
| 4,445,665 | 5/1984 | Cray ........................................... 254/88 |
| 4,724,875 | 2/1988 | Baldwin et al. . |
| 4,772,038 | 9/1988 | MacDonald . |
| 5,340,082 | 8/1994 | Holloway ................................... 254/88 |
| 5,904,339 | 5/1999 | Flinn ......................................... 254/88 |

FOREIGN PATENT DOCUMENTS

| | | |
|---|---|---|
| 385451 | 3/1965 | Switzerland . |
| 458505 | 3/1975 | U.S.S.R. . |

*Primary Examiner*—David A. Scherbel
*Assistant Examiner*—Lee Wilson
*Attorney, Agent, or Firm*—Richard C. Litman

[57] ABSTRACT

A trailer with expandable sides and retractable wheels used for performing on site vehicle maintenance and repair services. The trailer has a rectangular frame mounted on wheels with a conventional trailer coupler for attachment to a towing vehicle. The wheels are pivotally mounted to the frame, the wheels being locked in a ground engaging position for towing the trailer, and being unlocked so that the frame may be lowered into a ground engaging position by a plurality of hydraulic cylinders for the servicing of vehicles. The frame includes a plurality of crossbeams. A pair of side extenders telescope into the front, rear and center crossbeams so that the width of the trailer may be extended by hydraulic cylinders with the frame in a ground engaging position. The trailer includes a two-post hydraulic vehicle lift for raising the vehicle to be serviced.

20 Claims, 7 Drawing Sheets

TRAILER WITH EXPANDABLE SIDES AND RETRACTABLE WHEELS

BACKGROUND OF THE INVENTION

1. Field of the Invention

The present invention relates to portable vehicle service facilities, and particularly to a trailer for performing oil changes and other services on motor vehicles, the trailer having a frame with expandable sides, retractable wheels, and hydraulic vehicle lifts.

2. Description of the Related Art

Traditionally, automotive repair facilities operate from a garage in a fixed location. The garage provides repair personnel with many conveniences not otherwise available, and particularly with a hydraulic post lift for raising the vehicle in order to provide access to the underside of the vehicle for performing oil changes, muffler and exhaust system work, and transmission repairs, among other services. Without access to an automotive service garage, such access normally requires supporting the vehicle on jack stands. While adequate for many purposes, supporting a vehicle on jack stands means working under the vehicle in a cramped area with little room to maneuver. It also requires an adequate surface on which to place the stands, which may not be available, since asphalt or blacktop surfaces tend to crumble under the weight applied to the jack stands.

On the other hand, transporting the vehicle to a service garage at a fixed location is not always convenient. Obviously, when a vehicle requires emergency repairs, it may not be drivable, therefore requiring the expense and inconvenience of towing services. Even where only routine maintenance services are involved, it may still be more convenient and economical to have such services performed on site. An example of the latter situation is the routine servicing of a company's fleet of vehicles, including oil changes, lubrication, tire rotation, etc. It would therefore be desirable to have a portable vehicle service facility equipped with adequate working room and a lift for raising the vehicle above the ground. Several devices have addressed various aspects of this problem.

U.S. Pat. No. 3,931,895, issued Jan. 13, 1976 to S. Grimaldo, describes a collapsible trailer hoist for servicing automobile mufflers on site. The trailer has a frame supported by gravity jacks to take the load off the wheels while the car is driven up ramps onto a pair of tracks which are raised by front and rear pivoting beam arrangements resembling scissors jacks. U.S. Pat. No. 4,238,114, issued Dec. 9, 1980 to P. I. Migliorati, discloses a rocking platform for servicing a vehicle. The device has vehicle support rails mounted on a rocker base. The vehicle is driven up ramps onto the rails, the platform rocking as the vehicle's weight shifts. The device also includes a footpad with arms for removably attaching the footpad to the rails.

U.S. Pat. No. 4,394,877, issued Jul. 26, 1983 to L. Whyte, teaches a system for draining oil from a vehicle on site. The system includes a service vehicle with a waste receptacle mounted on a telescoping track section under the service vehicle. The waste receptacle may be extended under the vehicle to be serviced, which may be raised by ramps or by jack stands. U.S. Pat. No. 4,445,665, issued May 1, 1984 to D. L. Cray, shows a vehicle servicing lift having a frame mounted on wheels bearing a pair of vehicle ramps which are elevated and pivotally supported at their front end by columns. The frame is towed to the work site, the wheels are retracted by a hydraulic cylinder to lower the frame to the ground, the vehicle is driven or winched onto the ramps, and the rear end of the ramps is raised by hydraulic cylinders to support the vehicle in a level position horizontally. The lift is only designed to raise the vehicle three to four feet above ground level.

U.S. Pat. No. 4,724,875, issued Feb. 16, 1988 to Baldwin, et al., describes a trailer mounted lift for performing oil changes having outriggers to support the four corners of the rectangular trailer frame, a pair of ramps sloping from the trailer frame to the ground for loading the vehicle, a pair of tracks mounted on the frame which may be raised by hydraulic cylinders, and outboard extensions so that service personnel may walk around the vehicle while it is raised on the lift.

Less relevant devices including some features of the present invention or for performing a similar function include U.S. Pat. No. 4,350,222, issued Sep. 21, 1982 to Lutteke, et al. (an apparatus for farm vehicles which spreads wheels mounted on drop axles); U.S. Pat. No. 4,772,038, issued Sep. 20, 1988 to N. MacDonald (a trailer which tow three- and four-wheeler sporting vehicles when expanded, but it towed by the sporting vehicles when collapsed); Swiss Patent No. 385,451, published Mar. 15, 1965 (a rocking vehicle lift with parallel tracks mounted on circular sections, the separation between the tracks being adjustable by a hand crank mechanism); and Soviet Invention Certificate No. 458,505, published Mar. 12, 1975 (a device for lifting a vehicle from the side).

None of the above inventions and patents, taken either singularly or in combination, is seen to describe the instant invention as claimed. Thus a trailer with expandable sides and retractable wheels solving the aforementioned problems is desired.

SUMMARY OF THE INVENTION

A trailer with expandable sides and retractable wheels is used for performing on site vehicle maintenance and repair services. The trailer has a rectangular frame mounted on wheels with a conventional trailer coupler for attachment to a towing vehicle. The wheels are pivotally mounted to the frame, the wheels being locked in a ground engaging position for towing the trailer, and being unlocked so that the frame may be lowered into a ground engaging position by a plurality of hydraulic cylinders for the servicing of vehicles. The frame includes a plurality of crossbeams. A pair of side extenders telescope into the front, rear and center crossbeams so that the width of the trailer may be extended by hydraulic cylinders with the frame in a ground engaging position. The trailer includes a two-post hydraulic vehicle lift for raising the vehicle to be serviced.

Accordingly, it is a principal object of the invention to provide a trailer with extendible sides so that the trailer frame may be widened.

It is another object of the invention to provide a trailer with retractable wheels so that the frame may be lowered to a ground engaging position.

It is a further object of the invention to provide a trailer with a hydraulic post lift for raising a vehicle for maintenance and repair services.

Still another object of the invention is to provide a trailer with hydraulic means for locking retractable wheels into a ground engaging position, for lowering the trailer frame to a ground engaging position, and for extending telescoping side extenders for widening the trailer frame.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
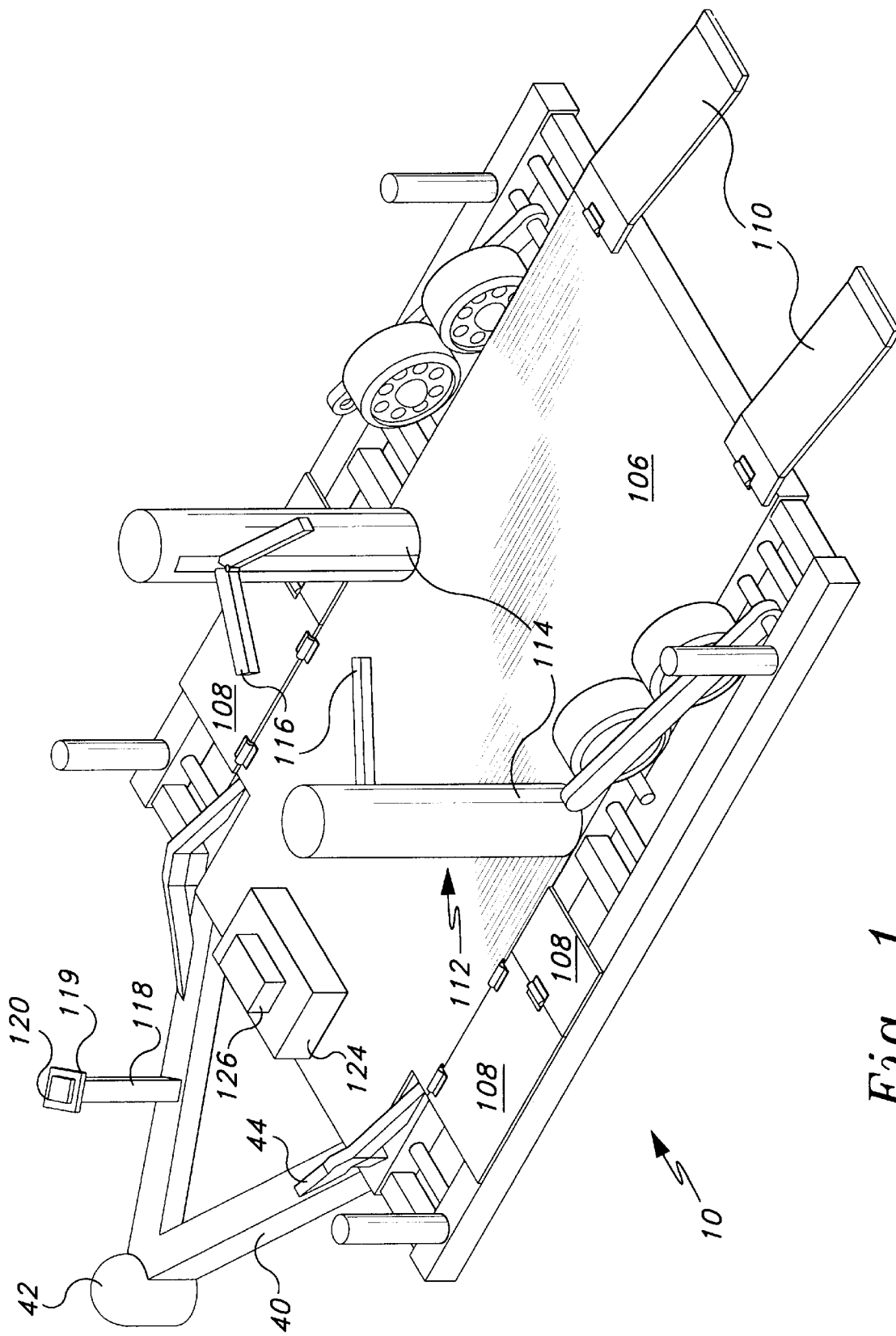
FIG. 1 is a perspective view of a trailer with expandable sides and retractable wheels according to the present invention.

The present invention is a trailer with expandable sides and retractable wheels, designated generally as 10 in the drawings, for use in performing on site oil changes and other maintenance and repair services on motor vehicles. The trailer 10 features retractable wheels so that the trailer frame may be lowered to the ground, expandable sides to enlarge the working space provided by the frame, and a pair of hydraulic lift posts for raising a motor vehicle so that service personnel may perform maintenance and repair services while standing under the vehicle.

Figure 2:
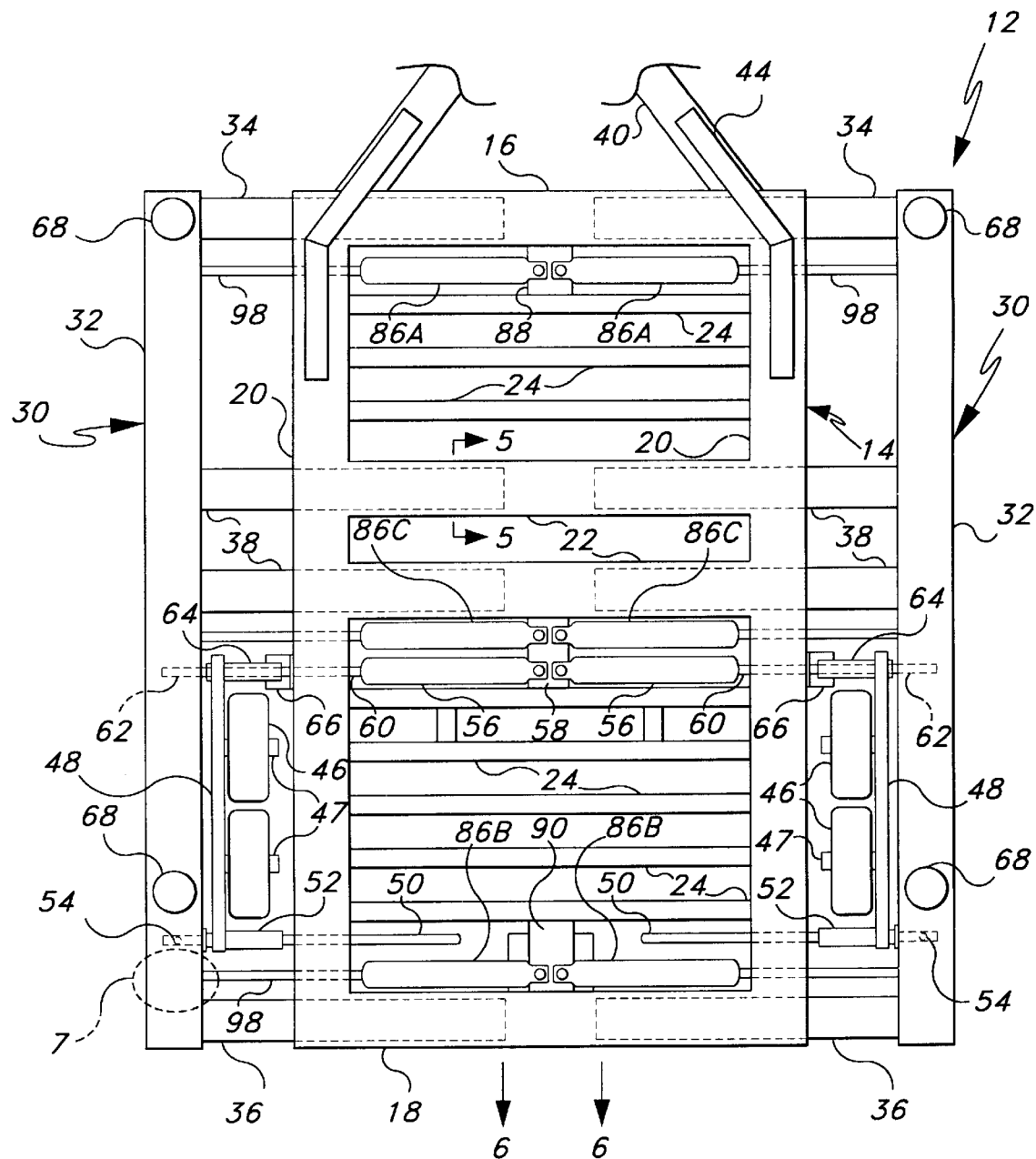
FIG. 2 is a plan view of the frame of a trailer with expandable sides and retractable wheels according to the present invention, the sides being retracted.
Figure 3:
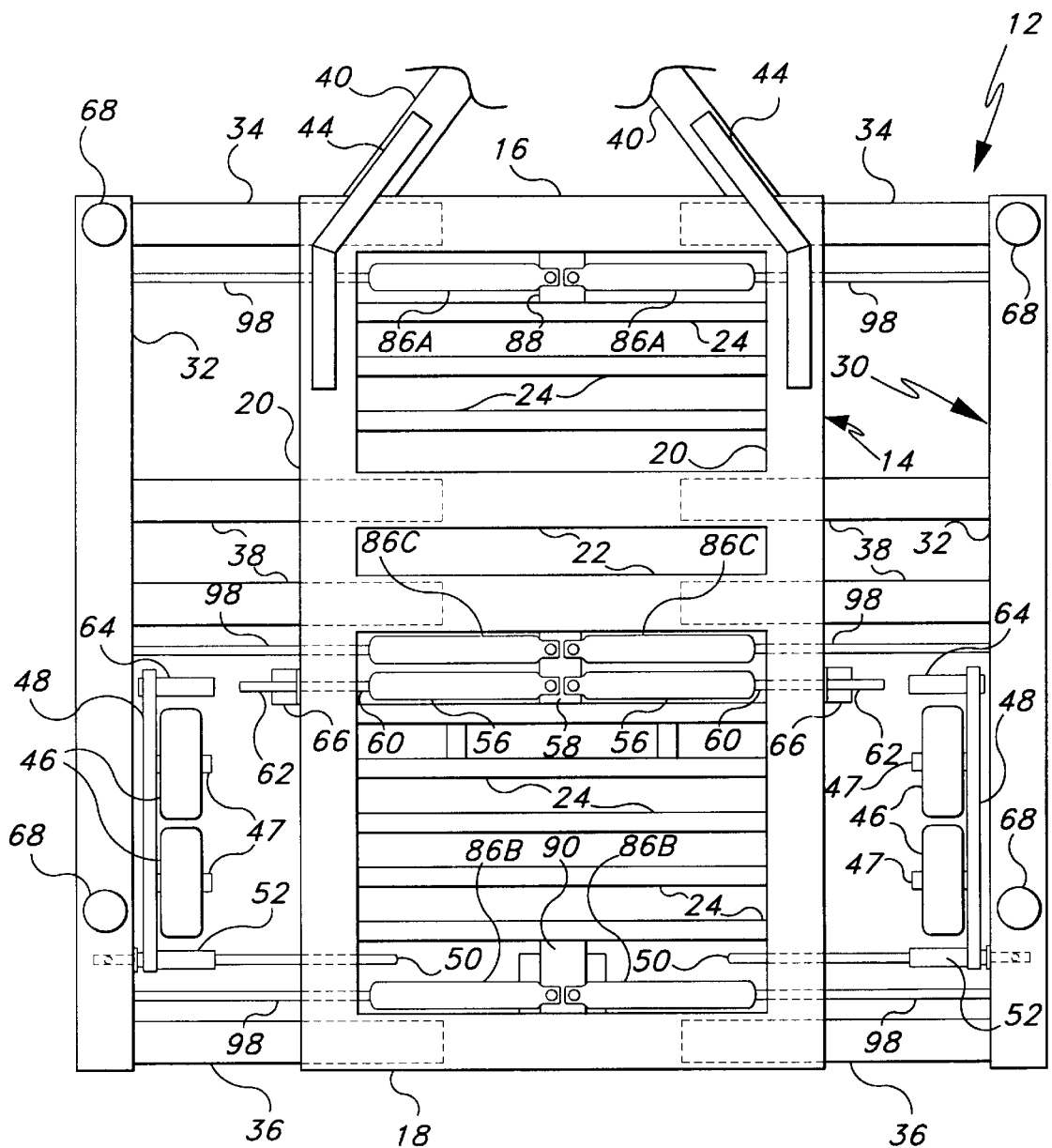
FIG. 3 is a plan view of the frame of a trailer with expandable sides and retractable wheels according to the present invention, the sides being expanded.

The frame 12 is shown more particularly in FIGS. 2 and 3 in which the decking has been removed to show the details of the frame. The frame 12 is rectangular and includes a central base 14 and a pair of side extenders 30 which engage the base 14 in telescoping fashion as described below. The central base 14 includes a front crossbeam 16, a rear crossbeam 18, and a pair of longitudinal rails 20 which are welded together to define a rectangle of fixed dimension. The base 14 also includes a pair of center crossbeams 22 and a plurality of support beams 24 extending between the longitudinal rails 20 and spaced apart from front to rear. The front 16, rear 18, and center crossbeams 22, as well as the longitudinal rails 20, are preferably hollow, tubular, and square in cross-section, being about four inches by four inches, the ends of the front 16, rear 18, and center 22 crossbeams being open laterally. The support beams 24 are also hollow and tubular, but may be smaller in dimension than the crossbeams 16, 18, 22 and rails 20.

Figure 5:
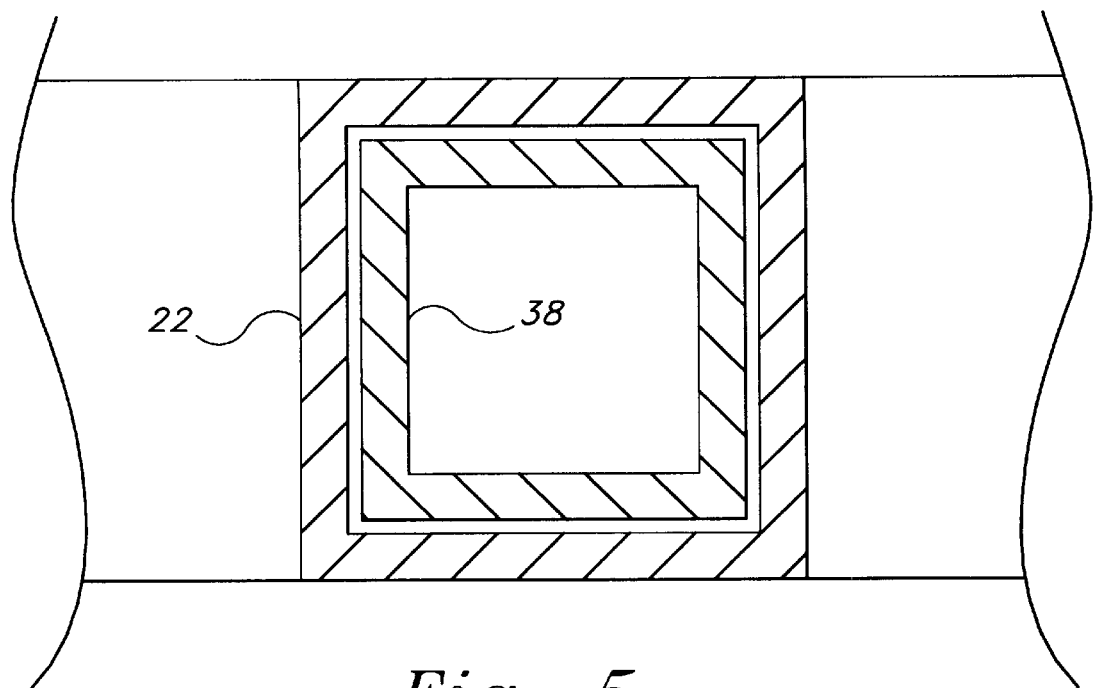
FIG. 5 is a section view along the line 5—5 of FIG. 2.

The side extenders 30 each include a side rail 32 substantially equal in length to and disposed parallel to the longitudinal rails 20, a front extender 34 at a right angle to one end of the side rail 32, and a rear extender 36 at a right angle to the other end of the side rail 32, defining a U-shape. A pair of spaced apart center extenders 38 extend from each side rail 32 in the same direction as the front 34 and rear 36 extenders. The front 34, rear 36, and center 38 extenders are hollow, tubular, and square in cross-section, and have an outside perimeter slightly smaller than the inside perimeter of the front 16, rear 18, and center crossbeams 22 so that the extenders 34, 36 and 38 are slidably disposed in the crossbeams 16, 18, and 22 respectively, as shown in FIG. 5.

The frame 12 includes means for attachment to a towing vehicle. In the embodiment shown in the drawings, trailer 10 is shown with a conventional V-shaped trailer tongue 40 with a socket 42 for attachment to a conventional ball hitch. The legs of the Vee are structurally supported by tongue supports 44 welded to the longitudinal rails 20. Although the tongue 40 of a ball and socket hitch are shown in the drawings, it will be understood that the trailer 10 may be attached to a towing vehicle by a gooseneck coupler, the particular form of towing means not being critical to the invention.

The frame 12 is supported on a plurality of retractable wheels 46. Each wheel 46 is rotatably mounted on an axle 47, the axles 47 being fixedly mounted in pairs on a link 48 which pivots around a pivot rod 50. Each link 48 is a flat, elongated plate pivotally mounted to the frame 12 at one end, and releasably mounted to the frame 12 at the other end by a locking mechanism described below. The pivot rods 50 extend through pivot tubes 52 welded to the links 48 and into apertures in the side rails 32, where they are secured by pins 54 extending through the rails 32 and transversely through the pivot rods 50. The pivot rods are long enough to support the wheels when the side extenders 32 are extended away from the longitudinal rails 20.

The frame 12 includes a plurality of double action hydraulic cylinders for expanding the frame 12 and locking the retractable wheels 46. With reference to FIG. 2, the trailer 10 is driven to the repair site with the frame 12 in a retracted position and the wheels 46 locked in an extended, ground engaging position, in which the wheels 46 support the load of the trailer 10, by a pair of locking hydraulic cylinders 56. The cylinders 56 have a clevis at one end which is secured with a clevis pin and hitch pin to a centrally located mounting plate 58 which is attached between a center cross beam 22 and a support beam 24. The cylinder rods 60 are given extended length by being bolted end to end with lock rods 62 of substantially the same diameter. The lock rods 62 are slidable in locking tubes 64 fixedly attached to the links 48 and into apertures defined in the side rails 32. The wheel locking mechanisms include semi-cylindrical stops 66 having an inside diameter slightly larger than the outside diameter of the locking tubes 64 which serve to stop the pivoting action of the links 48 by receiving the locking tubes 64, and to guide the lock rods 62 into the apertures in the side rails 32.

Figure 4:
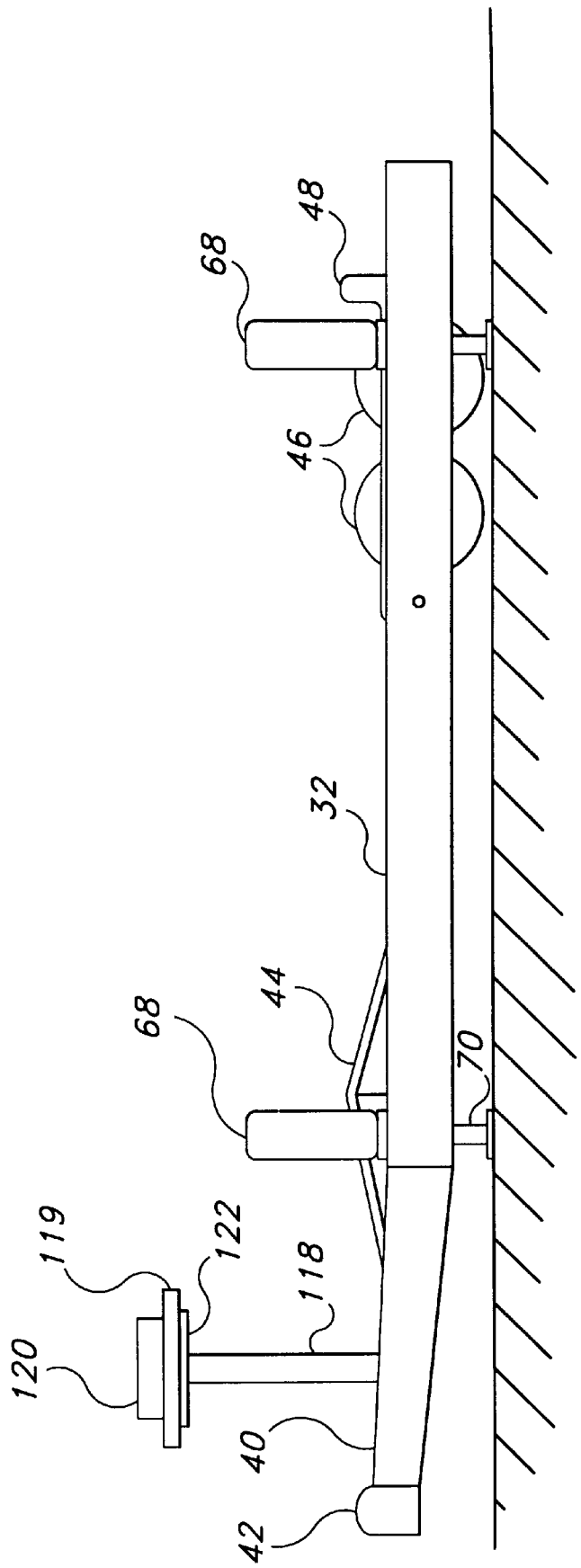
FIG. 4 is a side view of a trailer with expandable sides and retractable wheels according to the present invention, the lifting cylinders being extended.
Figure 8:
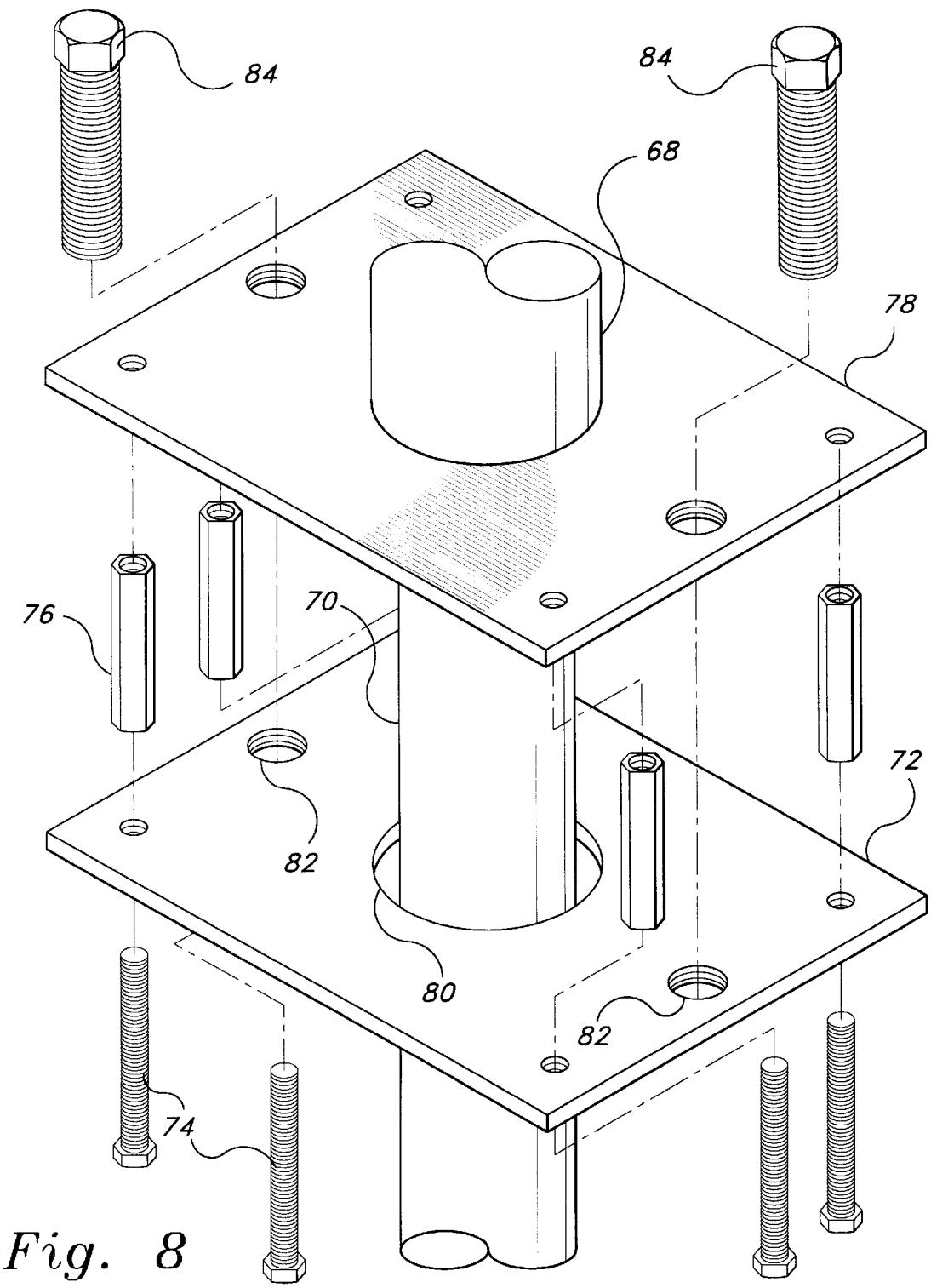
FIG. 8 is an exploded view of a mounting bracket for the lifting cylinders of a trailer with expandable sides and retractable wheels according to the present invention.

The trailer 10 includes a plurality of lifting cylinders 68 disposed in the side rails 32 adjacent to the four corners of the frame 12. As shown in FIG. 4, the lifting cylinders 68 are disposed vertically on the top of the side rails 32 with the rods 70 slidably disposed downward through the side rails 32. FIG. 8 shows a mounting bracket 72 for mounting the lifting cylinders 68 to the side rails 32. The mounting bracket 72 is a rectangular plate with four countersunk holes on its bottom surface which receive bolts 74 which extend through spacers 76 and attach the mounting bracket 72 to a plate 78 integral with the rod end of the cylinder 68. The mounting bracket 72 includes a central aperture 80 through which the rod 70 extends and a pair of holes 82 on opposite sides of the central aperture 80 through which bolts 84 extend for mounting the lifting cylinders to the side rails 32. When the trailer 10 arrives at the repair site, the lifting cylinders 68 are actuated to extend the rods 70 to a ground engaging position, relieving the weight from the wheels 46. The locking cylinders 56 are then actuated to retract the lock rods 62 from engagement with the side rails 32 and lock tubes 64, as shown in FIG. 3, permitting the links 48 to pivot on pivot rods 50. The side extenders 30 are expanded to expand the frame 12, and the lifting cylinders 68 are actuated to retract the rods 70, thereby lowering frame 12 to a ground engaging position, the wheels 46 pivoting to a retracted position as the frame 12 is lowered so that the frame 12 is in a ground engaging position, as shown in FIG. 1.

Figure 6:
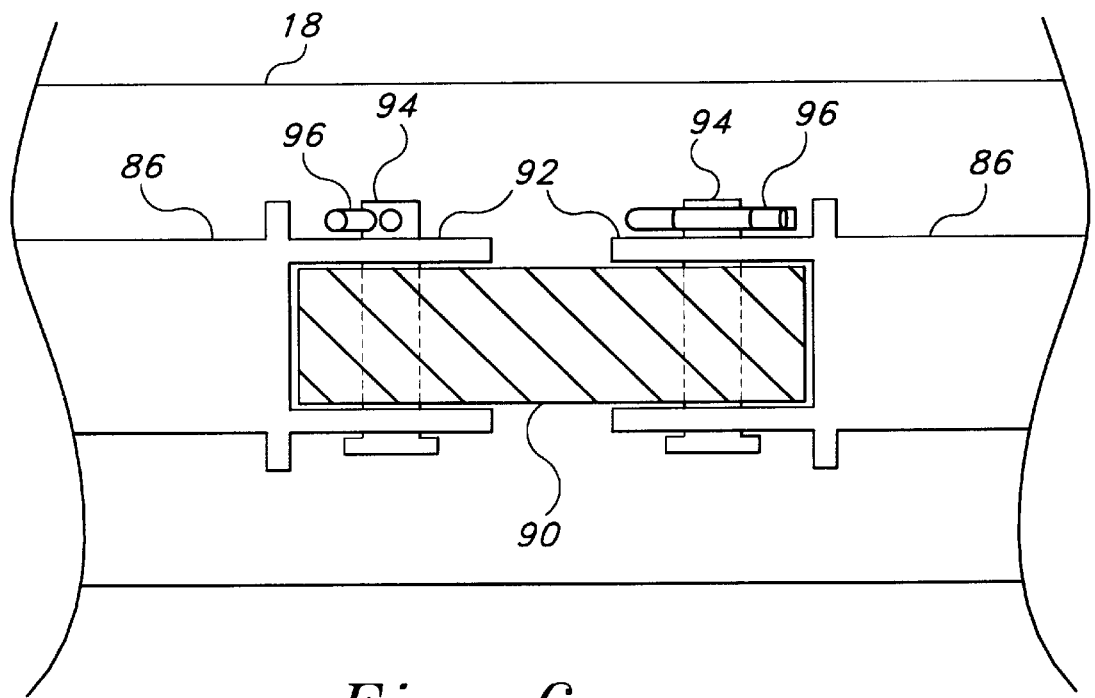
FIG. 6 is a section view along the line 6—6 of FIG. 2.

As shown in FIGS. 2 and 3, the frame 12 has six expansion cylinders 86, including two cylinders 86a adjacent the front crossbeam 16, two cylinders 86b adjacent the rear crossbeam 18, and two cylinders 86c adjacent the center crossbeams 22. In addition to the centrally located mounting plate 58, the frame 12 has front mounting plate 88 extending between the front crossbeam 16 and an adjacent support beam 24, and a rear mounting plate 90 mounted between the rear crossbeam 18 and an adjacent support beam 24. As shown in FIG. 6, one end of each cylinder 86 has a clevis 92, the arms of the clevis 92 being disposed about the mounting plate 90. A clevis pin 94 is inserted through the arms of the clevis 92 and the mounting plate 90 and secured with a hitch pin 96 in conventional fashion.

Figure 7:
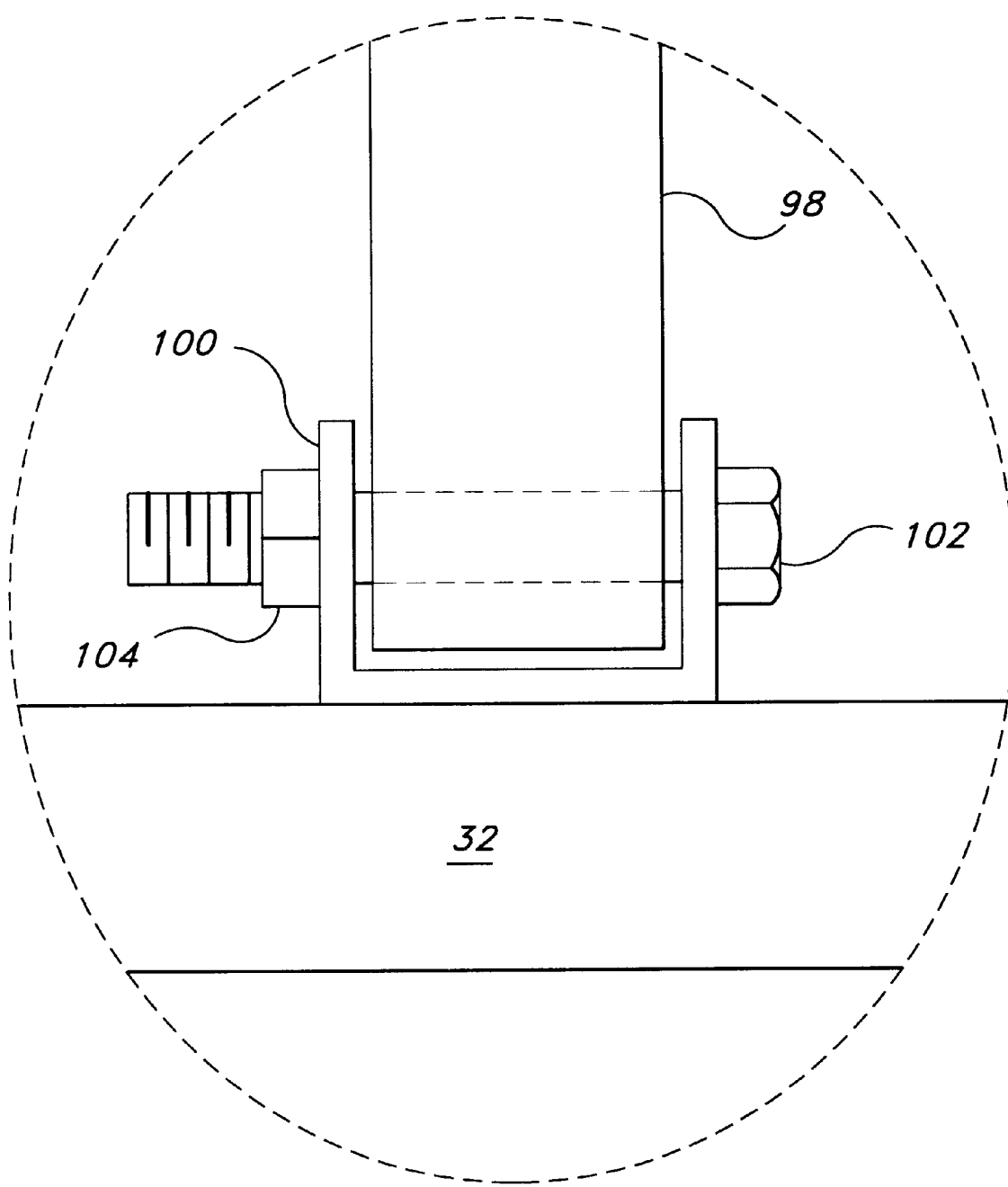
FIG. 7 is an expanded view of detail 7 in FIG. 2.

The cylinder rod 98 is attached to the side rails 32 as shown in FIG. 7. The side rails 32 have a U-shaped bracket 100 fixedly attached, as by welding, and a bolt 102 is inserted through the bracket 100 and rod 98 and secured by a nut 104. The frame has a retracted position, shown in FIG. 2, in which all of the rods 98 of the expansion cylinders 86 are retracted, and an expanded position, shown in FIG. 3, in which all of the rods 98 are extended in order to slide the side extenders 30 outward from the central base 14.

The frame 12 has top decking 106 comprising flat plate covering at least a portion of the frame 12 between the longitudinal rails 20 and extending between the front crossbeam 16 and the rear crossbeam 18. The trailer 10 may include additional side decking 108 hingedly attached to the top decking 106. When the frame 12 is in the expanded position, the side decking 108 covers open portions of the side extenders 30 so that maintenance personnel have a greater floor space to stand on while servicing vehicles. When the frame 12 is in the retracted position, the side decking 108 folds back on its hinges to lie flat on the top decking 106. The trailer includes a pair of short ramps 110 pivotally attached to the rear crossbeam 18 on hinges (the ramps 110 may be hingedly attached to beams (not shown) attached to the rear crossbeam 18). The ramps 110 are preferably about two feet wide and about twenty six inches long, and are raised and lowered manually. When the frame 12 is lowered to a ground engaging position, the ramps 110 form an inclined plane between the ground and the top decking 106 so that a vehicle may be driven or winched up the ramps 110 and onto the frame 12 for servicing.

In the preferred embodiment, a two-post hydraulic vehicle lift 112 is mounted on the top decking 106. The vehicle lift 112 includes a pair of posts 114 mounted between the center crossbeams 22 on opposite sides of the frame 12. The posts 114 are of fixed height of about nine feet, being generally U-shaped in horizontal cross-section and housing a hydraulic cylinder which raises and lowers a pair of vehicle lift arms 116 by means of a chain and sprocket type mechanism. In this type of lift, each post 114 supports half the weight of the vehicle. In the preferred embodiment, the lift raises the vehicle about six feet. Such two-post hydraulic vehicle lifts are well known in the art and will not be described further.

The trailer 10 further includes means for centrally controlling the hydraulic cylinders 56, 68, and 86 and for circulating hydraulic fluid through the system. In the drawings, these components are illustrated schematically by a post 118 and platform 119 supporting a two-gang hydraulic valve 120 for controlling the expansion cylinders 86 on its top surface, and a six-gang hydraulic valve 122 on its bottom surface for controlling the lifting 68 and locking 56 cylinders. The hydraulic system also has a reservoir 124 of hydraulic fluid, a hydraulic pump 126, and hydraulic lines (omitted from the drawings for clarity) for maintaining the flow of hydraulic fluid through the system, as is conventionally known in the art. The hydraulic reservoir 124 and pump 126 are shown schematically in the drawings, and may be positioned in any convenient location, such as on the trailer tongue 40.

The trailer 10 may be covered by a canopy (not shown).

Operation of the invention should be apparent from the foregoing description. The trailer 10 is towed to the repair site by a towing vehicle with the frame 12 in a retracted position and the wheels 46 locked in an extended position. The trailer 10 is detached from the towing vehicle, the trailer tongue 40 being supported by jack stands. The lifting cylinders 68 are extended to remove the trailer load from the wheels 46. The wheels 46 are unlocked and the sides of the frame 12 expanded. The frame 12 is lowered to a ground engaging position by retracting the rods of the lifting cylinders 68, the wheels 46 pivoting to a retracted position. The ramps 110 are lowered to engage the ground and the vehicle is driven onto the frame 12 between the posts 114 and raised for service by the vehicle lift 112. Upon completion of repair or maintenance services, the process is reversed to transport the trailer 10 to the next servicing site.

It will be obvious to those skilled in the art that the configuration of the trailer 10 may be altered without departing from the teachings of the present invention. For example, the hydraulic posts 114 may be positioned towards the front and rear of the trailer 10 and the ramps 110 may be positioned laterally so the vehicle may drive onto the trailer 10 from the side instead of the rear. In this case, the trailer 10 would not have to include expandable sides.

It is to be understood that the present invention is not limited to the embodiments described above, but encompasses any and all embodiments within the scope of the following claims.

I claim:

1. A trailer with expandable sides and retractable wheels, comprising:

a) a rectangular frame having a rectangular central base and a pair of side extenders slidable in the central base for expanding the width of said frame;

b) a plurality of wheels pivotally attached to said frame;

c) towing means for attaching the trailer to a towing vehicle;

d) lifting means for raising and lowering said frame;

e) locking means for locking said plurality of wheels in an extended, ground engaging position when locked, and permitting said plurality of wheels to pivot to a retracted position when unlocked, whereby said frame may be lowered to a ground engaging position;

f) expanding means for sliding said side extenders between an expanded position and a retracted position in order to vary the width of said frame; and g) vehicle lift means for raising a motor vehicle from said frame so that maintenance personnel may have access to the motor vehicle from a position below the vehicle for servicing the vehicle.

2. The trailer with expandable sides and retractable wheels according to claim 1, wherein said rectangular central base further comprises:
   a) a front crossbeam;
   b) a rear crossbeam;
   c) a pair of longitudinal rails, said front crossbeam, said rear crossbeam, and the longitudinal rails defining a rectangle;
   d) a pair of spaced apart center crossbeams extending between said longitudinal rails; and
   e) a plurality of spaced apart support beams extending between said longitudinal rails;
   f) wherein said front crossbeam, said rear crossbeam, said longitudinal rails and said center crossbeams are hollow, tubular, and substantially square in cross section.

3. The trailer with expandable sides and retractable wheels according to claim 2, wherein each of said side extenders further comprises:
   a) a side rail substantially equal in length to and disposed parallel to said longitudinal rails;
   b) a front extender attached to said side rail at a right angle;
   c) a rear extender attached to said side rail at a right angle, said side rail, said front extender and said rear extender defining a U-shape; and
   d) a pair of spaced apart center extenders extending from said side rail in the same direction as said front extender and said rear extender;
   e) wherein said front extender, said rear extender, and said pair of center extenders are hollow, tubular, and square in cross-section, having an outside perimeter slightly smaller than the inside perimeter of said front crossbeam, said rear crossbeam, and said center crossbeams, said extenders being slidably disposed in said crossbeams.

4. The trailer with expandable sides and retractable wheels according to claim 1, further comprising a pair of links disposed between said central base and said side extenders, each link comprising a flat, elongated plate having a first end and a second end, the first end being pivotally attached to said frame by a pivot rod, the second end having a lock tube extending though said link, each of said links further comprising at least one axle disposed between said first end and said second end, said plurality of wheels being rotatably mounted on said axles.

5. The trailer with expandable sides and retractable wheels according to claim 1, wherein said towing means comprises a trailer tongue having a socket of a ball and socket hitch.

6. The trailer with expandable sides and retractable wheels according to claim 1, wherein said locking means comprises:
   a) a pair of hydraulic cylinders, each hydraulic cylinder having a cylinder and a rod, said cylinders being mounted on said frame so that said rods extend in opposite directions;
   b) a lock rod attached to and axially aligned with the rod of each of said hydraulic cylinders, said lock rod extending through a link on which at least on of said plurality of wheels is mounted and into one of said side extenders when the rod of said hydraulic cylinder is extended in order to lock said wheel in a ground engaging position, and said lock rod retracting to disengage from the link in order to unlock said wheel when the rod of said hydraulic cylinder is retracted.

7. The trailer with expandable sides and retractable wheels according to claim 1, wherein said lifting means comprises a plurality of hydraulic cylinders, each hydraulic cylinder having a cylinder and a rod, said plurality of hydraulic cylinders being mounted vertically on said side extenders, the rods of said hydraulic cylinders being extendable through said side extenders in order to engage a ground surface when said frame is supported on said plurality of wheels and being retractable to permit said frame to engage the ground surface when said plurality of wheels is unlocked.

8. The trailer with expandable sides and retractable wheels according to claim 1, wherein said expanding means comprises a plurality of hydraulic cylinders, each hydraulic cylinder having a cylinder attached to said central base and a rod attached to said side extender, the rods being extended to expand the width of said frame and being retracted to contract the width of said frame.

9. The trailer with expandable sides and retractable wheels according to claim 1, wherein said vehicle lift means comprises a two-post hydraulic vehicle lift attached to said frame.

10. The trailer with expandable sides and retractable wheels according to claim 1, further comprising top decking, the top decking comprising a flat plate covering at least a portion of the central base of said frame.

11. The trailer with expandable sides and retractable wheels according to claim 10, further comprising side decking pivotally attached to said top decking, said side decking covering at least a portion of said side extenders when said frame is in the expanded position.

12. The trailer with expandable sides and retractable wheels according to claim 1, wherein said vehicle lift means comprises a two-post hydraulic vehicle lift attached to said frame.

13. A trailer with expandable sides and retractable wheels, comprising:
   a) a rectangular frame having:
      i) a central base including a front crossbeam, a rear crossbeam, and a pair of longitudinal rails, defining a rectangle, further including a pair of spaced apart center crossbeams extending between said longitudinal rails and a plurality of spaced apart support beams extending between said longitudinal rails, wherein said front crossbeam, said rear crossbeam, said longitudinal rails and said center crossbeams are hollow, tubular, and substantially square in cross section; and
      ii) a pair of side extenders slidable in the central base for expanding the width of said frame, each of the side extenders including a side rail substantially equal in length to and disposed parallel to said longitudinal rails, a front extender attached to said side rail at a right angle, a rear extender attached to said side rail at a right angle, said side rail, said front extender and said rear extender defining a U-shape, a pair of spaced apart center extenders extending from said side rail in the same direction as said front extender and said rear extender, and wherein said front extender, said rear extender, and said pair of center extenders are hollow, tubular, and square in cross-section, having an outside perimeter slightly smaller than the inside perimeter of said front crossbeam, said rear crossbeam, and said center crossbeams, said extenders being slidably disposed in said crossbeams;

b) a plurality of wheels pivotally attached to said frame;

c) towing means for attaching the trailer to a towing vehicle;

d) lifting means for raising and lowering said frame;

e) locking means for locking said plurality of wheels in an extended, ground engaging position when locked, and permitting said plurality of wheels to pivot to a retracted position when unlocked, whereby said frame may be lowered to a ground engaging position;

f) expanding means for sliding said side extenders between an expanded position and a retracted position in order to vary the width of said frame; and g) vehicle lift means for raising a motor vehicle from said frame so that maintenance personnel may have access to the motor vehicle from a position below the vehicle for servicing the vehicle.

14. The trailer with expandable sides and retractable wheels according to claim 13, further comprising a pair of links disposed between said central base and said side extenders, each link comprising a flat, elongated plate having a first end and a second end, the first end being pivotally attached to said frame by a pivot rod, the second end having a lock tube extending though said link, each of said links further comprising at least one axle disposed between said first end and said second end, said plurality of wheels being rotatably mounted on said axles.

15. The trailer with expandable sides and retractable wheels according to claim 14, wherein said locking means comprises:

a) a pair of hydraulic cylinders, each hydraulic cylinder having a cylinder and a rod, said cylinders being mounted on said frame so that said rods extend in opposite directions; and b) a lock rod attached to and axially aligned with the rod of each of said hydraulic cylinders, said lock rod extending through the lock tube in the second end of said link and into one of said side extenders when the rod of said hydraulic cylinder is extended in order to lock said wheel in a ground engaging position, and said lock rod retracting to disengage from the link in order to unlock said wheel when the rod of said hydraulic cylinder is retracted.

16. The trailer with expandable sides and retractable wheels according to claim 13, wherein said towing means comprises a trailer tongue having a socket of a ball and socket hitch.

17. The trailer with expandable sides and retractable wheels according to claim 13, wherein said lifting means comprises a plurality of hydraulic cylinders, each hydraulic cylinder having a cylinder and a rod, said plurality of hydraulic cylinders being mounted vertically on the side rails of said side extenders, the rods of said hydraulic cylinders being extendable through said side rails in order to engage a ground surface when said frame is supported on said plurality of wheels and being retractable to permit said frame to engage the ground surface when said plurality of wheels is unlocked.

18. The trailer with expandable sides and retractable wheels according to claim 13, wherein said expanding means comprises:

a) a pair of hydraulic cylinders mounted to said frame adjacent said front cross beam, each hydraulic cylinder having a cylinder attached to a mounting plate extending between said front crossbeam and one of said support beams, and a rod attached to said side rail, the rods extending in opposite directions; and b) a pair of hydraulic cylinders mounted to said frame adjacent said rear cross beam, each hydraulic cylinder having a cylinder attached to a mounting plate extending between said rear crossbeam and one of said support beams, and a rod attached to said side rail, the rods extending in opposite directions;

c) wherein the rods of said hydraulic cylinders may be extended to expand the width of said frame and retracted to contract the width of said frame.

19. The trailer with expandable sides and retractable wheels according to claim 18, wherein said expanding means further comprises a pair of hydraulic cylinders mounted to said frame adjacent one of said center cross beams, each hydraulic cylinder having a cylinder attached to a mounting plate extending between said center crossbeam and one of said support beams, and a rod attached to said side rail, the rods extending in opposite directions, wherein the rods of said hydraulic cylinders may be extended to expand the width of said frame and retracted to contract the width of said frame.

20. The trailer with expandable sides and retractable wheels according to claim 13, wherein said vehicle lift means comprises a hydraulic vehicle lift having at least one post attached to said frame.

* * * * *